United States Patent [19]

Wheatley et al.

[11] Patent Number: 5,234,729
[45] Date of Patent: Aug. 10, 1993

[54] MULTILAYER POLYMERIC REFLECTIVE BODIES FOR DECORATIVE AND SECURITY APPLICATIONS

[75] Inventors: John A. Wheatley; Walter J. Schrenk, both of Midland; David M. Wisniewski, Freeland, all of Mich.

[73] Assignee: The Dow Chemical Company, Midland, Mich.

[21] Appl. No.: 842,864

[22] Filed: Feb. 27, 1992

[51] Int. Cl.$^5$ ............................................. G02B 5/28
[52] U.S. Cl. ................................ 428/30; 428/130; 428/155; 428/176; 428/167; 428/212; 428/213; 428/411.1
[58] Field of Search ............... 428/30, 130, 155, 176, 428/167, 212, 213, 215, 220, 409, 411.1, 204, 206, 76, 332, 916, 913.3

[56] References Cited

U.S. PATENT DOCUMENTS

| | | | |
|---|---|---|---|
| 2,415,375 | 3/1947 | Sedgley | 428/176 |
| 3,711,176 | 1/1973 | Alfrey, Jr. et al. | 359/359 |
| 3,759,647 | 9/1973 | Schrenk | 425/133.5 |
| 3,773,882 | 11/1973 | Schrenk . | |
| 3,858,977 | 1/1975 | Baird et al. | 356/71 |
| 3,884,606 | 5/1975 | Schrenk | 425/133.5 |
| 4,094,947 | 6/1978 | Alfrey, Jr. et al. | 264/171 |
| 4,164,343 | 7/1979 | Wilcox et al. | 428/212 |
| 4,329,309 | 5/1982 | Kelly | 264/167 |
| 4,540,623 | 9/1985 | Im et al. | 428/220 |
| 4,738,891 | 3/1988 | Vighi | 428/204 |
| 4,768,939 | 9/1988 | Bourcier et al. | 425/66 |
| 4,874,571 | 10/1989 | Müller | 264/175 |
| 4,980,220 | 12/1990 | Boultinghouse | 428/155 |

OTHER PUBLICATIONS

"Research on thin film auticounterfeiting coatings at the National Research Council of Canada," *Applied Optics*, vo. 28, No. 14, Jul. 15, 1989.

*Primary Examiner*—Patrick J. Ryan
*Assistant Examiner*—Cathy K. Lee

[57] ABSTRACT

A multilayered reflective polymeric body of alternating layers of polymers wherein at least a portion of the layers are in a folded-over relationship is provided along with a coextrusion apparatus and method of preparing the multilayer polymeric body. The reflective polymeric body includes at least first and second diverse polymeric materials having a sufficient number of alternating layers of the first and second polymeric materials such that a portion of the light incident on the body is reflected. The first and second polymeric materials differ from each other in refractive index by at least about 0.03. The reflective body is thermoformable and may be fabricated into wall panels, dishware, decorative trims, and the like, and may also find use in security applications such as credit cards, credit card emblems, or on currency.

15 Claims, 4 Drawing Sheets

MULTILAYER POLYMERIC REFLECTIVE BODIES FOR DECORATIVE AND SECURITY APPLICATIONS

BACKGROUND OF THE INVENTION

The present invention relates to a multilayered polymeric body comprising multiple optical thickness layer types, at least a portion of which are in a folded relationship, which body reflects light and which can be fabricated to have an iridescent or silvery appearance; to decorative articles produced therefrom which may find use as wall panels, dishware, and decorative trims; and to security articles produced therefrom which may find use in anticounterfeiting applications.

Highly reflective articles (i.e., articles having a reflectance of 70–85% or greater) are generally sought by industry for a number of uses. Conventional methods for fabricating reflective surfaces include forming such surfaces of highly polished metals. However, because of the high costs and fabricating problems involved in using metals, more recently fabricators have used plastic surfaces which contain thin coatings of metal thereon. Thus, metal coated plastic articles are now commonly found as both decorative and functional items in a number of industries. Such articles are used as bright work for consumer appliances such as refrigerators, dishwashers, washers, dryers, radios, and the like. These types of articles are also used by the automotive industry as head lamp reflectors, bezels, radio knobs, automotive trim, and the like.

Typically, such metal coated plastic articles are formed by electroplating or by the vacuum, vapor, or chemical deposition of a thin metal layer on the surface of the article. However, such coatings are subject to the chipping and flaking of the metal coatings as well as corrosion of the metal over time. If additional protective layers must be applied over the metal coating to protect it, additional labor and materials costs are involved. Further, there may be environmental disposal problems with some metal deposition processes.

Multilayer articles of polymers are known, as are methods and apparatuses for making such articles. For example, such multilayered articles may be prepared utilizing multilayer coextrusion devices as described in commonly-assigned U.S. Pat. Nos. 3,773,882 and 3,884,606 to Schrenk. Such devices are capable of simultaneously extruding diverse thermoplastic polymeric materials in substantially uniform or varying layer thicknesses. The number of layers may be multiplied by the use of a device as described in commonly-assigned U.S. Pat. No. 3,759,647 to Schrenk et al.

Im et al, U.S. Pat. No. 4,540,623, teach a multilayer laminated article which includes a polycarbonate as one of the alternating layers. The articles of Im et al, however, are intended to be transparent rather than reflective and to exhibit optical properties comparable to a pure polycarbonate polymer.

Alfrey, Jr. et al, U.S. Pat. No. 3,711,176, teach a multilayered highly reflective thermoplastic body fabricated using thin film techniques. That is, the reflective optically thin film layers of Alfrey, Jr. et al rely on the constructive interference of light to produce reflected visible, ultraviolet, or infrared portions of the electromagnetic spectrum. Such reflective optically thin films have found use in decorative items because of the iridescent reflective qualities of the film. However, because the film relies solely on the optically thin layers, such films are limited to uses requiring iridescent reflective properties and are not practical for uses which require a silvery or colorless reflectivity.

In the security field, artisans have used optically variable reflective devices on credit cards and currency in attempts to foil counterfeiters These reflective devices include metal and prismatic foils, embossed foils, and holographic foils which can be incorporated onto or into credit cards and the like. Baird et al, U.S. Pat. No. 3,858,977, teach the use of optically thin iridescent films as an anticounterfeiting device. However, the costs of fabrication of these devices make them expensive to use. Further, many of these devices require the use of metal to obtain their reflective properties.

Accordingly, there remains a need in the art for a highly reflective polymeric sheet or body which can be post formed into a variety of decorative and useful reflective items. Further, there is a need for iridescent, silvery or metallic appearing articles which do not use metal.

SUMMARY OF THE INVENTION

The present invention meets those needs by providing a multilayered polymeric reflective body which can be iridescent or silvery in appearance, highly reflective, post formable, and capable of being fabricated into a variety of decorative and/or security articles. The introduction of folded-over layers into the otherwise substantially planar layer structure of the body produces unique optical effects. The terms "reflective", "reflectivity", "reflection", and "reflectance" as used herein refer to total reflectance (i.e., ratio of reflected wave energy to incident wave energy). For bodies which are silvery in appearance, the reflectance is sufficiently specular in nature such that the polymeric body has a metallic appearance. The use of these terms is intended to encompass semi-specular or diffuse reflection such as that of brushed metal, pewter, and the like.

A specific intensity of reflectance, when used herein, is the intensity of reflection which occurs at a wavelength where negligible absorption occurs. For example, a silver appearing article reflects substantially all visible wavelengths (white light), whereas the introduction of a dye to achieve other metallic hues will necessarily lower reflectivity of the body at the absorbing wavelengths. Wavelengths unaffected by the dye will be reflected at essentially the same intensity as a non-dyed sample, and it is at these unaffected wavelengths to which the intensity of reflectance is referring. Likewise, where an article exhibits iridescent color, the intensity of reflection is measured at a wavelength corresponding to the color exhibited.

According to one aspect of the present invention, a multilayer reflective polymeric body of at least first and second diverse polymeric materials is provided in which the first and second polymeric materials differ from each other in refractive index by at least about 0.03. The body should comprise a sufficient number of alternating layers of the first and second polymeric materials such that at least a portion of the light incident on the body is reflected. As used herein, the term "light" is meant to encompass not only visible light but also electromagnetic radiation in both the infrared and ultraviolet regions of the spectrum. The term "a portion of the light incident on the body is reflected" refers, as discussed above, to reflected light at wavelengths where negligible absorption occurs.

At least a portion of the reflective polymeric body includes the alternating layers in a folded-over relationship which produces striations on portions on the body and results in a number of optically unique, advantageous properties. The folded-over layers are formed while the body is in a freshly extruded condition. Excess material from several surface layers is caused to build up and then double over on itself causing a layer multiplication for that part of the body and producing the unique optical effects. Alternatively, the entire body may be caused to be folded upon itself. This folding can increase the number of layers in the body to double or greater than the original number.

The portion of the body containing the folded-over layers has a greater reflectivity than the remaining portions of the body because of the presence of additional layers. Further, in one embodiment of the invention, addition of a coloring agent to one of the layers in the polymeric body imparts a three-dimensional appearance to the surface of the body where the folded-over layers are located. The body is also versatile in its construction in that it may be constructed so as to appear silvery and/or iridescent in color, depending on the arrangement and optical thicknesses of the layers.

The optical thicknesses of the alternating layers may vary. In one embodiment of the invention, a substantial majority of the alternating layers have optical thicknesses of at least about 0.45 $\mu$m or less than about 0.09 $\mu$m (optically thick or optically very thin layers, respectively). In an alternative embodiment, a portion of the alternating layers have optical thicknesses between 0.09 and 0.45 $\mu$m (optically thin), and the remaining layers have optical thicknesses of not greater than 0.09 $\mu$m or not less than 0.45 $\mu$m (optically thick/very thin layers). In other embodiments of the invention, the alternating layers may all have optical thicknesses in the range of from 0.09 $\mu$m to 0.45 $\mu$m. Thus, the polymeric body may comprise alternating optically thick layers, combinations of optically thick/very thin layers, combinations of optically thin and optically thick/very thin layers, or alternating optically thin layers.

Optically very thin layers (i.e., less than about 0.09 $\mu$m optical thickness) as well as optically thick layers (i.e., greater than about 0.45 $\mu$m) reflect substantially white light over a wide spectrum of visible wavelengths. Multilayer bodies of alternating polymer layers which are optically thick or a combination of optically thick and optically very thin possess a silvery, metallic appearance, while multilayer bodies comprising alternating polymer layers which are optically thin have an iridescent appearance with intense varying colors. The appearance of the body may be controlled by the positioning and percentage of optically thin layers in the body. Further, in the practice of the present invention, the presence of folded-over layers adds a unique optical appearance to the surface of the body. The folded-over layers may comprise any of the three layer types described above.

The reflective body of the present invention may be made up of two or more generally transparent polymer resins. Preferred are thermoplastic resins which are capable of being post formed into a variety of shapes. In a preferred embodiment of the invention, the first polymeric material comprises polycarbonate and the second polymeric material comprises polymethyl methacrylate. In other embodiments of the invention, elastomers may be used to provide a body which can be stretched and relaxed.

More than two different polymers may be present in the multilayer body. For example, the optically thin layers may comprise a pair of first and second polymers and the optically thick/very thin layers may comprise a pair of different first and second polymers Folded-over layers may be introduced into either or both of the layer stacks. The layer types may then be laminated together as desired to form the reflective body.

The reflective polymeric body is preferably in the form of a sheet having two major exterior surfaces An outer layer may be included as a surface or skin layer on both major exterior surfaces of the reflective body. The skin layer may be sacrificial, or may be permanent and serve as a scratch resistant and weatherable protective layer. The skin layer is preferably applied to the body during or after extrusion of the multilayer construction. For example, a skin layer may be applied as a sprayed on coating which acts to level the surface of the body to improve optical properties and impart scratch resistance, chemical resistance and/or weatherability. The skin layer may also be laminated to the multilayered body.

In certain embodiments of the invention, to obtain high reflectivity it is desirable to form the reflective polymeric body to comprise at least 500 or more layers. Increasing the total number of layers in the polymeric body has been found to increase its reflectivity (i.e., the percentage of incident light reflected from the body). Thus, by controlling the number of layers, the degree of reflectivity of the article may be controlled. Areas of the body having folded-over layers will exhibit greater reflectivity because of the presence of additional layers in that portion of the body.

In some embodiments of the invention, it may be desirable to incorporate coloring agents such as dyes or pigments into one or more of the individual layers of the polymeric body. We have found that the use of pigmented coloring agents in the interior layers causes light either to be absorbed or to reflect off the surface of the body so as to impart a three-dimensional appearance, especially in those areas of the body where folded-over layers are present. The coloring agent is preferably incorporated into at least one interior layer in the body. Alternatively, the coloring agent may be incorporated into an outer (i.e., exterior) layer. The coloring agents may be selected to give the polymeric body a metallic appearance other than a silvery or iridescent appearance such as bronze, copper, or gold, for example.

Different colors such as black, blue, red, yellow, white, and the like may also be used. Coloring agents may also be used in combination to provide desirable coloring and optical properties.

The multilayer reflective polymeric bodies of the present invention may be post formed into a number of decorative or useful items. Such post forming operations may include thermoforming, vacuum forming, or pressure forming. Further, through the use of forming dies, the multilayer reflective body may be initially formed into a variety of useful shapes including profiles such as bodies having angled portions, flanges, T-shapes, and the like. The multilayer reflective polymeric bodies of the present invention may also find uses in security applications such as on currency or as credit card emblems as indicia of authenticity or as devices which cannot be readily reproduced or copied by counterfeiters. The multilayer reflective bodies may also be formed into the credit card substrate itself.

The present invention also provides an extrusion apparatus for preparation of the multilayer reflective body of the present invention comprising at least first and second sources of heat plastified thermoplastic material, and combining means for receiving the heat plastified material from the first and second sources and arranging the first and second sources of heat plastified materials in a layered relationship to form a composite stream. A shaping die in communication with the combining means is also provided which is arranged so as to permit substantially streamlined flow of the composite stream through the die to form the multilayer body.

Means are also included adjacent the shaping die for modifying at least the surface of at least a portion of the multilayer body to fold over at least some of the layers onto themselves. Such means includes at least two cooling rolls positioned on opposing sides of the multilayer body exiting the die. A means for driving the cooling rolls is also provided wherein the cooling rolls are operated at a slower linear speed than the speed of the multilayer body exiting the die (or material from the die is supplied at a faster rate than the speed of operation of the rolls), causing an excess of layered material on the intake side of the rolls to be built up and folded over as the multilayer body passes between the rolls. The speed of the rolls may be cyclically varied to create and maintain the folding of the layers on a substantially continuous basis. Alternatively, the apparatus may be controlled to cause the entire body to fold over upon itself. Lateral fold over in the machine direction may also be promoted by extruding a sheet having a non-uniform surface using a die having serrated or saw-tooth shaped die lips.

The present invention also provides a method for preparing a multilayer reflective polymeric body comprising the steps of providing at least first and second streams of heat plastified thermoplastic materials, receiving and combining the first and second streams of materials in a layered relationship to form a composite stream, directing the composite stream to flow through a shaping die to form a multilayer body, and modifying at least the surface of at least a portion of the multilayer body by folding over a portion of the layers onto themselves. Alternatively, the entire body may be caused to fold over upon itself.

A preferred method of modifying at least the surface of the multilayer body includes the step of passing the multilayer body through at least two cooling rolls positioned on opposing sides of the body. The cooling rolls are operated so that an excess of layered material on the intake side of the rolls is built up and then flattened onto the surface of the sheet as the sheet passes between the rolls to form folded-over layers on the multilayer body. Preferably, the cooling rolls are operated at a slower linear speed than the speed of the multilayer body exiting the die. Alternatively, the amount of multilayer material exiting the die may be increased. In addition, the speed of the cooling rolls is preferably cyclically varied so as to create and maintain the folding of the layers on a substantially continuous basis.

Accordingly, it is an object of the present invention to provide a multilayer reflective polymeric body having unique optical properties comprising multiple optical thickness layer types which have folded-over layers on at least a portion of the surface of the body and which can be fabricated into a variety of decorative and security articles, is post formable, and which may have an iridescent or colorless appearance. This, and other objects and advantages of the invention will become apparent from the following detailed description, the accompanying drawings, and the appended claims.

DETAILED DESCRIPTION OF THE PREFERRED EMBODIMENTS

The present invention provides a highly reflective multilayer polymeric body made up of from a hundred to several thousand layers of the same or different types of optical layers. The alternating layers of polymeric materials may have an optical thickness of at least 0.45 $\mu m$ (optically thick), or may have a combination of optically thick layers with layers having an optical thickness of not greater than 0.09 $\mu m$ (optically very thin), or may have optical thicknesses between 0.09 and 0.45 $\mu m$ (optically thin), where the optical thickness is defined as the product of the individual layer thickness times the refractive index of the polymeric material which makes up that layer. Different combinations of layer types will produce a reflective body having different appearances. Likewise, the optical thicknesses of the folded-over or striated layers will affect the appearance of the body giving the surface of the body a three-dimensional appearance. The thicknesses of the individual layers may be controlled to some extent by the layer forming and manipulation steps explained in greater detail below. Generally, as the layers are folded over, a thinning of individual layer thicknesses occurs.

Thus, in one form of the invention, the polymeric reflective body comprises either optically thick layers of at least 0.45 $\mu m$, or combinations of optically thin layers and optically thick and/or very thin layers having optical thicknesses of not greater than 0.09 $\mu m$ or not less than 0.45 $\mu m$, respectively, to produce a silvery reflective appearance. The use of a substantial number of optically thin layers in the body produces vivid, iridescent reflected colors.

For purposes of optical properties, i.e., reflectance and transmittance, an optically thin layer can be described as a layer having an optical thickness in the range of from $\lambda/4$ to $5\ \lambda/4$, where $\lambda$ represents the visible wavelength range. Thus, for layers to be used in the visible wavelength band, an optically thin layer has been described in the literature as one whose thickness, D, is less than about 0.5 $\mu m$ or whose optical thickness, ND (where N is the refractive index of the material) is less than about 0.7 $\mu m$. Vasicek, *Optics of Thin Films* (1960) at pages 100 and 139.

Optically thin film layers rely on the constructive optical interference of light to produce intense reflected light in the visible, ultraviolet, or infrared portions of the electromagnetic spectrum according to the equation (for a two component system):

$$\lambda_m = (2/m)(N_1D_1 + N_2D_2),$$

where $\lambda_m$ is the reflected wavelength in nanometers, $N_1$ and $N_2$ are the refractive indices of the alternating polymers, $D_1$ and $D_2$ are the thickness of the respective layers of polymers in nanometers, and m is the order of reflection (m = 1, 2, 3, 4, 5). Each solution of the equation determines a wavelength at which an intense reflection, relative to surrounding regions, is expected. The intensity of the reflection is a function of the "f-ratio" where, $$f = N_1D_1/(N_1D_1 + N_2D_2)$$

By proper selection of the f-ratio, one can exercise some degree of control over the intensity of reflection of the various higher order reflections. For example, first order visible reflections of violet (0.38 μm wavelength) to red (0.68 μm wavelength) can be obtained with layer optical thicknesses between about 0.075–0.25 μm. Iridescent films may also be designed to reflect visible light at higher order reflectances, although at lower intensities.

For certain embodiments of the invention, it is desirable to use optically thin layers in combination with optically thick layers or combinations of optically thick/very thin layers so that the reflective body will exhibit a colored or silvery iridescence. The optically thin layers may be in the folded-over layers or may be in the remainder of the body.

In other embodiments of the invention, the multilayer bodies are designed so that they do not display vivid iridescence. By combining layers which are too thick or too thin to cause iridescence, a reflection which is essentially silver and non-iridescent results. This silvery appearance is due to higher order reflections from the optically thick and/or very thin layers being so closely spaced that the human eye perceives the reflection to be essentially non-iridescent.

For a two component system of alternating layers of polymers having optical thicknesses in the thick or very thin range, the reflective characteristics of articles are governed by the following equation:

$$R = (kr)/(1 + (k-1)r) \times 100,$$

where R is the amount of reflected light (%), k is the sum of optically thick and optically thick/very thin layer interfaces, and $r = [(N_1 - N_2)/(N_1 + N_2)]^2$, where $N_1$ and $N_2$ are the refractive indices of the polymers. See Vasicek, *Optics of Thin Films* (1960) at pages 69–70.

This equation indicates that the intensity of the reflected light is a function only of r and k, where r and k are defined as above. As a close approximation, R is a function only of the refractive index mismatch of the two polymer components and the number of layer interfaces.

The present invention judiciously combines layers having differing optical thicknesses to obtain a multilayer reflective polymeric body which exhibits a unique iridescent or colorless reflectance, depending upon the desired combination of layers. By positioning the folded-over layers at different portions of the surface of the body, additional unique optical effects are provided.

The reflective polymeric bodies of the present invention become more highly reflective of incident light (i.e., transmit less light) as the number of layers is increased. Preferably, the number of layers is sufficient to produce an article which will reflect at least 30% of the incident light for those wavelengths for which there is negligible absorption. Reflectances below about 30% are not sufficient to be readily observed except for iridescence.

The reflectivity of the body is affected by the difference in refractive index between the various polymers making up the reflective body. That is, the greater the difference in refractive index at each layer interface, the greater the reflectivity of the body. Accordingly, it can be seen that the reflective nature of the polymeric bodies may be controlled by the selection of polymers.

The reflective multilayered polymeric bodies of the present invention may comprise alternating layers of a wide variety of generally transparent thermoplastic materials. Suitable thermoplastic resins, along with representative refractive indices, which may be used in the practice of the present invention include, but are not limited to: copolycarbonates of bisphenol and thiodiphenol (refractive index = 1.59 to 1.64), blends of polymethyl methacrylate and polyvinylidene fluoride (1.38 to 1.49), bisphenol A polycarbonate (1.59), copolymers of methyl methacrylate and vinylidene fluoride (1.42 to 1.38), polymethyl acrylate (1.48), polymethyl methacrylate (1.49), blends and copolymers of polymethyl methacrylate and polyvinylidene fluoride; copolymers of vinylidene fluoride and other halogenated monomers such as chlorofluoroethylene, chlorodifluoroethylene, chlorotrifluoroethylene, hexafluoroacetone, hexafluoropropylene, hexafluoropropene, pentafluoropropylene, trifluoroethylene, tetrafluoroethylene, and vinyl fluoride blended with polymethyl methacrylate; blends of polyvinylidene fluoride and poly(vinyl acetate); copolymers of methyl methacrylate, vinylidene fluoride, and a monomer selected from the group consisting of chlorofluoroethylene, chlorodifluoroethylene, chlorotrifluoroethylene, hexafluoroacetone, hexafluoropropylene, hexafluoropropene, pentafluoropropylene, trifluoroethylene, tetrafluoroethylene, and vinyl fluoride blended with polymethyl methacrylate; blends of polyvinylidene fluoride and poly(vinyl acetate); perfluoroalkoxy resins (1.35); polytetrafluoroethylene (1.35); fluorinated ethylenepropylene copolymers (1.34); silicone resins (1.41); polyvinylidene fluoride (1.42); polychlorotrifluoroethylene (1.42); epoxy resins (1.45); poly(butyl acrylate) (1.46); poly(4-methylpentene-1) (1.46), poly(vinyl acetate) (1.47), ethyl cellulose (1.47), polyformaldehyde (1.48), polyisobutyl methacrylate (1.48), polymethyl acrylate (1.48), polypropyl methacrylate (1.48), polyethyl methacrylate (1.48), polyether block amide (1.49); cellulose acetate (1.49); cellulose propionate (1.49); cellulose acetate butyrate (1.49), cellulose nitrate (1.49), polyvinyl butyral (1.49), propylene (1.49); polybutylene (1.50); ionomeric resins such as Surlyn (trademark) (1.51), low density polyethylene (1.51), polyacrylonitrile (1.51), polyisobutylene (1.51), thermoplastic polyesters such as Ecdel (trademark) (1.52); natural rubber (1.52); perbunan (1.52); polybutadiene (1.52); nylon (1.53); polyacrylic imides (1.53); poly(vinyl chloro acetate) (1.54); polyvinyl chloride (1.54); high density polyethylene (1.54); copolymers of methyl methacrylate and styrene such as Zerlon (trademark) (1.54); transparent acrylonitrile-butadiene-styrene terpolymer (1.54); allyl diglycol resin (1.55), blends of polyvinylidene chloride and polyvinyl chloride such as Saran resins (trademark) (1.55); polyalphamethyl styrene (1.56); styrene-butadiene latexes such as Dow 512-K (trademark) (1.56), polyurethane (1.56); neoprene (1.56); copolymers of styrene and acrylonitrile such as Tyril resin (trademark) (1.57); copolymers of styrene and butadiene (1.57); polycarbonate (1.59); other thermoplastic polyesters such as polyethylene terephthalate and polyethylene terephthalate glycol (1.60); polystyrene (1.60); polyamide (1.61); polyvinylidene chloride (1.61); polydichlorostyrene (1.62); polysulfone (1.63); polyethylene naphthalate (1.64); polyether sulfone (1.65); and polyetherimide (1.66).

A condition for the selection of the polymers to make up the layers of the body is that the polymers selected have refractive indices which differ from each other by at least about 0.03. Further, the polymers should preferably be compatible in processing temperatures so that they may be readily coextruded.

Multilayer bodies in accordance with the present invention are most advantageously prepared by employing a multilayered coextrusion device as described in U.S. Pat. Nos. 3,773,882 and 3,884,606, the disclosures of which are incorporated herein by reference. Such a device provides a method for preparing multilayered, simultaneously extruded thermoplastic materials. Preferably, a series of layer multiplying means are employed as described in U.S. Pat. No. 3,759,647, the disclosure of which is incorporated herein by reference. Such devices are capable of providing substantially continuous multilayered, simultaneously extruded thermoplastic materials. An extrusion device such as that disclosed in Alfrey, Jr. et al, U.S. Pat. No. 4,094,947 may also be used to produce multilayered articles in which the layer thicknesses of the inner layers can be varied.

Figure 1:
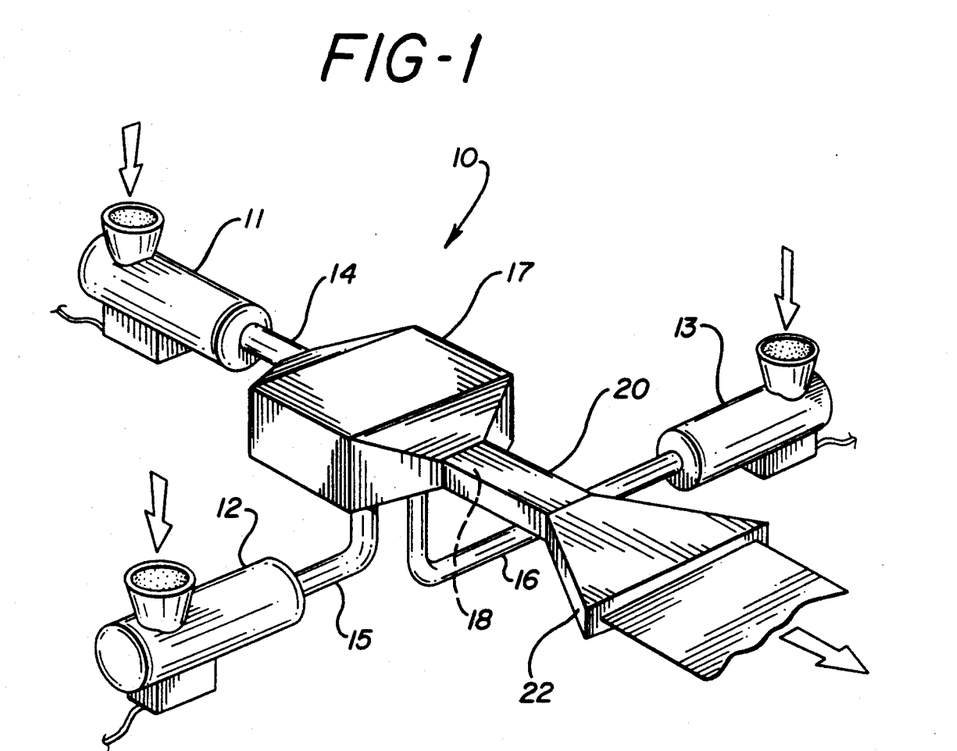
FIG. 1 is a schematic representation of an apparatus for preparing the multilayered polymeric body of the present invention.

A typical extrusion apparatus for the preparation of the multilayer reflective body of the present invention is illustrated schematically in FIG. 1. There, extrusion apparatus 10 includes, in cooperative combination, first, second, and optional third sources of heat plastified polymeric resins for extruders 11, 12, and 13, respectively. An optional third source of polymer resin may used when it is desired to produce a body having different layer repeating unit patterns such as ABCABC or ABCBABCB or when it is desired to provide protective boundary layers with the body. The third polymer may differ in refractive index from the first and second polymers. In one embodiment, the third polymer may comprise a copolymer of the first and second components.

Extruders 11, 12, and (optionally) 13 discharge the heat plastified polymeric resins into conduits 14, 15, and 16, respectively. A coextrusion feedblock die 17 is in operative combination with conduits 14, 15, and 16 and receives first, second, and optional third heat plastified streams therefrom. A heat plastified polymer stream may also be fed into the upstream end of feedblock die 17 to form protective boundary layers as the polymers are coextruded. Die 17 combines and arranges the heat plastified polymers into layered relationships as taught in the aforementioned U.S. Pat. Nos. 3,773,882 and 3,884,606. Die 17 further defines an extrusion orifice 18 from which issues a composite stream of polymeric material having alternating substantially planar layers of first and second (and optionally third) polymeric materials.

From orifice 18, the composite stream passes optionally through a mechanical manipulating section 20 which serves to rearrange the alternating layers into a stream having more than the original number of layers as taught in the aforementioned U.S. Pat. Nos. 3,565,985 and 3,759,647. Additional manipulating sections may be arranged in series to further multiply the number of layers in the stream. The number of additional layers created using the manipulation devices of the aforementioned patents is determined by the number of layers divided by the layer-dividing vane in those devices.

Figure 4A:
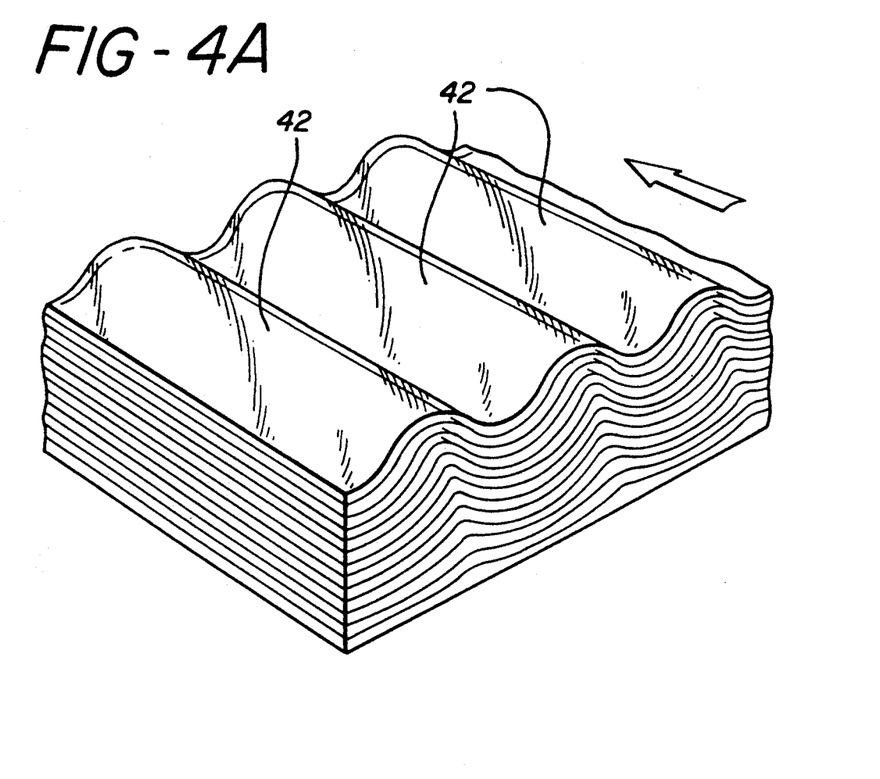
FIGS. 4A and 4B are perspective views of the multilayer reflective polymeric body of the present invention showing non-uniform extruded surfaces, wavy in FIG. 4A and saw-toothed in FIG. 4B, to encourage layer fold over in the machine direction.
Figure 4B:
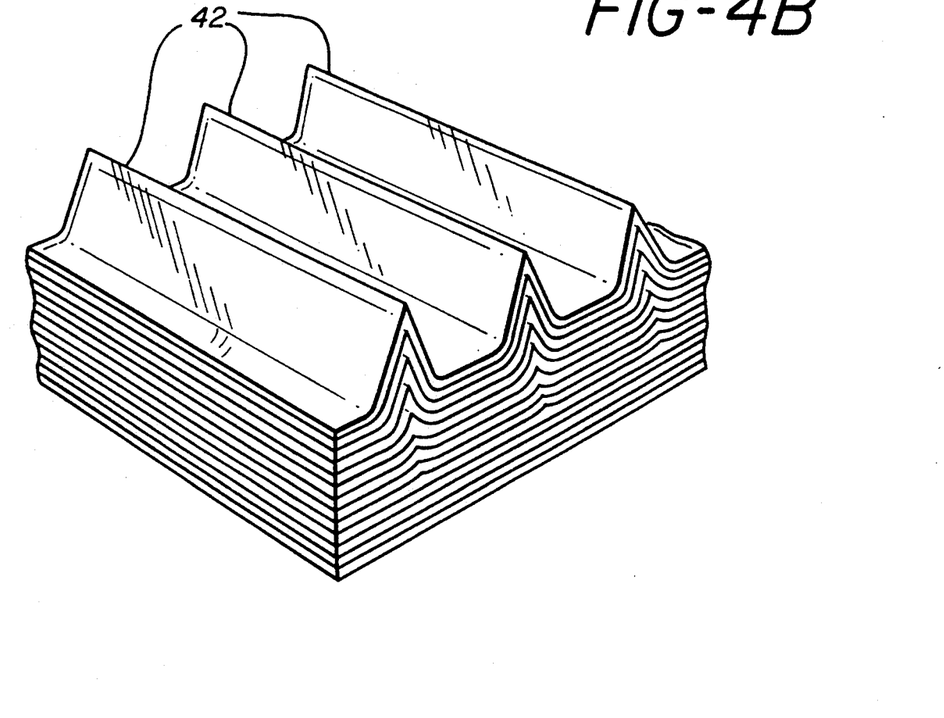

The multilayered stream is then passed into a shaping die 22 which is so constructed and arranged that streamlined flow is maintained therein. Such an extrusion die is described in U.S. Pat. No. 3,557,265, the disclosure of which is incorporated by reference herein. While a sheet or film forming die 22 is illustrated, it will be appreciated by those skilled in the art that a forming die of any desired configuration may be use to extrude not only films and sheets, but also other profiles and shapes. Further, the lips of the die may be serrated, saw-toothed, or wavy in configuration to provide non-uniformities 42 in the surface of the extruded body 44 as illustrated in FIGS. 4A (sinusoidal waves) and 4B (saw tooth ridges). These surface non-uniformities promote the folding over of the layers in the machine direction of travel of the body as described in greater detail below.

The configuration of the shaping die can vary and can be such as to reduce the thickness of each of the layers. The precise degree of reduction in thickness of the layers delivered from the mechanical orienting section, the configuration of the die, and the amount of mechanical working of the body after extrusion are all factors which affect the thickness of the individual layers in the final body.

Figure 2:
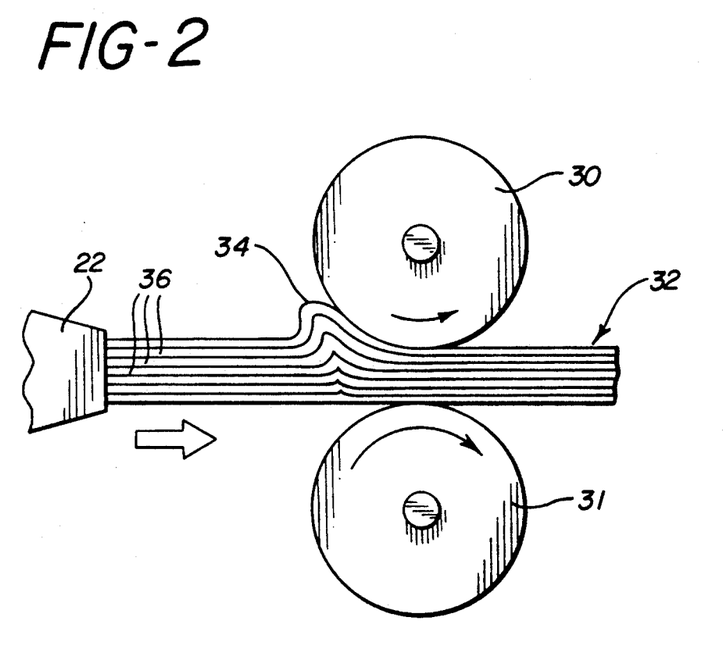
FIG. 2 is an expanded schematic view illustrating the cooling rolls of the extrusion apparatus of the present invention and the bank of thermoplastic material which is caused to accumulate at the intake side of the rolls.
Figure 3:
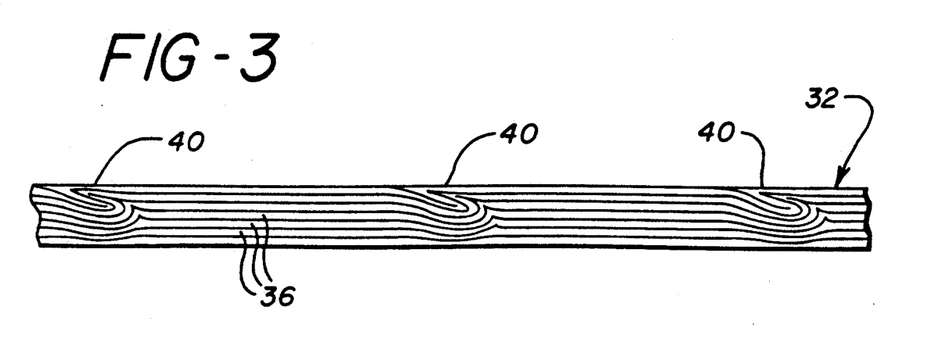
FIG. 3 is a side view of the structure of the multilayer reflective polymeric body of the present invention showing folded-over layers.

Means are also included adjacent the shaping die for modifying at least the surface of at least a portion of the multilayer body to fold over at least some of the layers onto themselves. As illustrated in FIG. 2, such means comprise two cooling rolls 30, 31 positioned on opposing sides of the multilayer body 32 exiting the die. A means for driving the cooling rolls is also provided in which at least one of the cooling rolls is operated at a slower speed than the speed of the multilayer body exiting the die, causing an excess of layered material 34 on the intake side of the rolls to be built up and folded over as the multilayer body passes between the rolls. Depending on the relative speeds of rolls 30, 31 and the orientation of the body, excess material may be built up on one or both surfaces of the body. FIG. 3 illustrates the alternating layers 36 as they appear in the final sheet of the polymeric reflective body. As is shown, layers 40 are in a folded-over relationship which increase the total numbers of layers in that portion of the body.

It must be remembered that the multilayer bodies of the present invention may comprise up to several hundred or a thousand or more layers having thicknesses of only a fraction of a micrometer. Thus, illustration of the layers in the drawings, both as to number and thickness, is greatly simplified and exaggerated for ease of understanding.

Thus, in the embodiment illustrated in FIG. 2, the excess material is built up and flattened on the surface of the sheet to form folded-over layers on the final multilayer body. This produces layer fold over in a direction generally normal to the direction of travel of the sheet (machine direction). In order to maintain the proper layer multiplication on a continuous basis, the speed of the cooling rolls is preferably cyclically varied. As an example, the speed of the cooling rolls may be cyclically varied between about 1 ft/min and 5 ft/min. Where the layered body is extruded downwardly in a vertical direction between cooling rolls 30, 31, a bank of excess material may be caused to build up on both surfaces of the body.

Figure 5A:
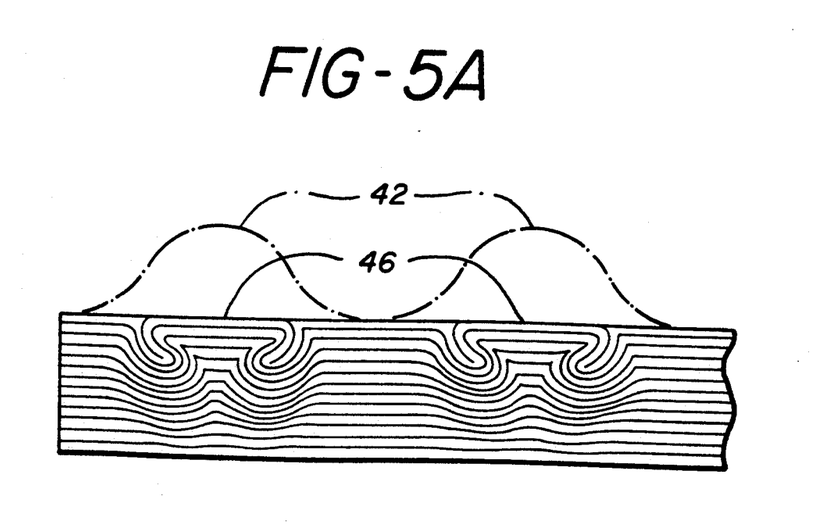
FIGS. 5A and 5B are sectional views of the bodies of FIGS. 4A and B, respectively, after a portion of the layers have been folded over.
Figure 5B:
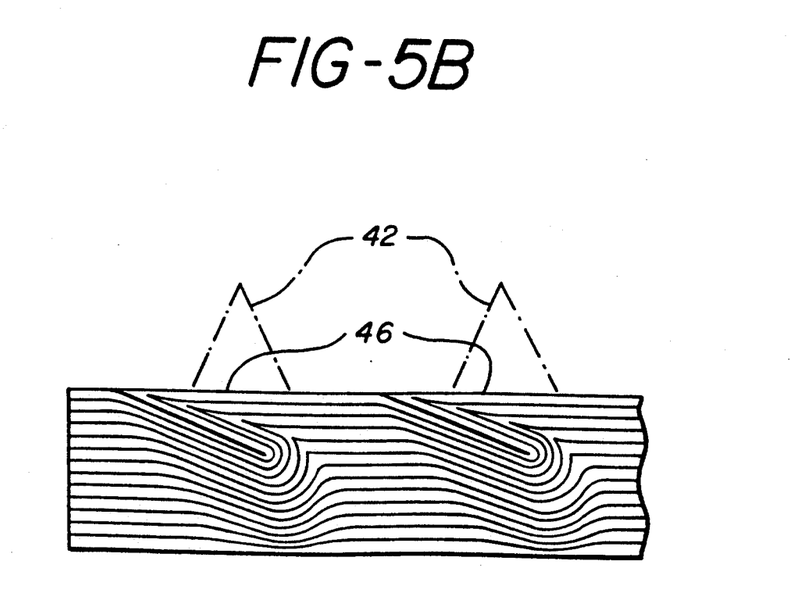

In another embodiment of the invention, one or both of the die lips on forming die 22 may have a serrated, saw-toothed, or wavy configuration to produce non-uniformities 42 in one or both surfaces of the extruded bodies. These non-uniformities promote lateral fold over of the layers as shown in FIGS. 5A and 5B. As the sheet or body passes between cooling rolls 30, 31, the layered polymeric material in areas 46 (best seen in FIGS. 5A and 5B) flows and folds into the areas of non-uniformity.

Reflective polymeric bodies produced by the practice of the present invention have a wide variety of useful applications. In some embodiments of the invention it may be desirable to incorporate coloring agents such as dyes or pigments into one or more of the individual layers of the polymeric body. It is desirable to use pigmented coloring agents in the interior layers to impart a three-dimensional appearance to the surface of the body. This can be done to one of the outer or skin layers of the body, or alternatively, the coloring agent may be incorporated into one or more interior layers in the body. The coloring agents may be selected to give the polymeric body a metallic appearance other than its normal silvery appearance such as bronze, copper, or gold, for example.

Different colors such as black, blue, red, yellow, white, and the like may also be used. Coloring agents may be used in combination to provide desirable coloring and optical properties.

Additionally, the highly reflective polymeric bodies may be fabricated as non-corroding metallic appearing articles for indoor or outdoor exposure. For example, the polymeric bodies may be fabricated into signs, or bright work for appliances. The bodies may be post formed into highly reflective decorative items such as wall panels, dishware, decorative trims, or the like, by processes such as thermoforming, vacuum forming, shaping, rolling, or pressure forming.

The bodies may also be used for security applications such as credit card emblems or on currency. For example, the body may be embedded into or secured onto the surface of a credit card similar to the manner in which holographic or prismatic foils are currently used. Alternatively, the body may be formed into the credit card itself. The body may also be secured to a portion of a document, such as a document indicating title. The body may also be used on paper currency, or be formed into plastic currency.

In order that the invention may be more readily understood, reference is made to the following example, which is intended to be illustrative of the invention, but is not intended to be limiting in scope.

EXAMPLE 1

A 2,625 layer melt stream of Calibre 303-22 (trademark) polycarbonate (refractive index 1.59) and Acrylite H15-003 (trademark) polymethyl methacrylate (refractive index 1.49) was produced using a 165 layer feedblock and four layer multipliers as taught in U.S. Pat. Nos. 3,773,882 and 3,759,647. In addition, skin layers were extruded onto both exterior surfaces of the melt stream which comprised 75% by weight Calibre 303-22 (trademark) polycarbonate and 25% by weight polycarbonate dye concentrate. Roll speed was cycled manually between 1 ft/min and 5 ft/min in order to continually produce folded-over layers in the body like those illustrated in FIGS. 2 and 3. The multilayer sheet which was produced had an overall silvery reflective appearance with areas of varying intense iridescent color indicating the presence of both optically thick and/or optically very thin layers as well as optically thin layers. The folded-over layers exhibited a three-dimensional stepped visual effect of overlapping stacked layers similar to a deck of cards where the cards are offset from adjacent cards in the deck.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A multilayer reflective polymeric body of at least first and second diverse generally transparent polymeric materials, arranged in a sufficient number of alternating layers of said first and second polymeric materials such that at least 30% of the light incident on said body is reflected, wherein said first and second polymeric materials differ from each other in refractive index by at least about 0.03, and wherein at least a portion of said reflective polymeric body includes at least some of said alternating layers in a folded-over relationship.

2. The multilayer reflective polymeric body of claim 1 wherein said folded-over relationship of said layers produces striations on portions of said body.

3. The multilayer reflective polymeric body of claim 1 wherein said body comprises at least 500 layers.

4. The multilayer reflective polymeric body of claim 1 wherein said body is thermoformable.

5. The multilayer reflective polymeric body of claim 1 including a coloring agent incorporated into at least one layer of said polymeric body.

6. The multilayer reflective polymeric body of claim 1 wherein a substantial majority of said alternating layers have optical thicknesses of at least 0.45 $\mu$m or less than 0.09 $\mu$m.

7. The multilayer reflective polymeric body of claim 1 wherein a portion of said alternating layers have optical thicknesses between 0.09 $\mu$m and 0.45 $\mu$m and the remaining layers have optical thicknesses of not greater than 0.09 $\mu$m or not less than 0.45 $\mu$m.

8. The multilayer reflective polymeric body of claim 1 wherein the portion of said layers in said folded-over relationship have optical thicknesses of at least 0.45 $\mu$m or less than 0.09 $\mu$m.

9. The multilayer reflective polymeric body of claim 1 wherein a portion of said layers in said folded-over relationship have optical thicknesses between 0.09 and 0.45 $\mu$m and the remaining layers have optical thicknesses of not greater than 0.09 $\mu$m or not less than 0.45 $\mu$m.

10. The multilayer reflective polymeric body of claim 1 wherein a substantial majority of said alternating layers have optical thicknesses of greater than 0.09 μm and less than 0.45 μm.

11. The multilayer reflective polymeric body of claim 1 wherein a substantial majority of the individual layers of said first polymeric material in said folded-over relationship have an optical thickness of at least 0.45 μm and a substantial majority of the individual layers of said second polymeric material in said folded-over relationship have an optical thickness of 0.09 μm or less.

12. The multilayer reflective polymeric body of claim 1 in which said body is extruded as a profile.

13. The multilayer reflective polymeric body of claim 1 in which said body is post formed into a profile.

14. The multilayer reflective polymeric body of claim 1 wherein said polymeric body is in the form of a sheet having two major surfaces.

15. The multilayer reflective polymeric body of claim 1 wherein said polymeric body includes a protective skin layer on at least one major surface thereof.

* * * * *